United States Patent [19]

Fish

[11] Patent Number: 5,166,664
[45] Date of Patent: Nov. 24, 1992

[54] WARNING METHOD AND APPARATUS AND PARALLEL CORRELATOR PARTICULARLY USEFUL THEREIN

[76] Inventor: David Fish, Elkana P.O. Box 268, 44814 D.N. Efraim, Israel

[21] Appl. No.: 561,638

[22] Filed: Aug. 2, 1990

[30] Foreign Application Priority Data

Aug. 15, 1989 [IL] Israel ............................ 91325
Nov. 24, 1989 [IL] Israel ............................ 92432

[51] Int. Cl.$^5$ ............................................. G08B 1/08
[52] U.S. Cl. ................................. 340/539; 340/531; 340/505; 340/825.08
[58] Field of Search ............... 340/539, 531, 573, 511, 340/506, 500, 825.06–825.13, 505, 518, 870.11, 870.09, 870.16; 379/38–48, 51

[56] References Cited

U.S. PATENT DOCUMENTS

| | | | |
|---|---|---|---|
| 4,101,872 | 7/1978 | Pappas | 340/539 |
| 4,331,953 | 5/1982 | Blevins et al. | 340/573 |
| 4,367,458 | 1/1983 | Hackett | 340/539 |
| 4,442,426 | 4/1984 | Heuschmann et al. | 340/539 |
| 4,978,946 | 12/1990 | Nordholm et al. | 340/309.15 |

*Primary Examiner*—Donnie L. Crosland
*Attorney, Agent, or Firm*—Benjamin J. Barish

[57] ABSTRACT

A method and apparatus for monitoring a particular location for the occurrence of a predetermined condition, such as fire, smoke, gas, etc., involves continuously transmitting, from a transmitter located at the monitored location, to a receiver, a source of electrical signals at a predetermined repetition rate having a period less than the interval between the electrical signals by at least one order of magnitude, and interrupting the transmission of the electrical signals upon sensing the predetermined condition. For example, the transmitted electrical signals may be coded bursts of pulses having burst periods of the order of milliseconds or nanoseconds, and spaced intervals of the order of seconds. Also, described is a parallel correlator which may be used as the decoder.

20 Claims, 6 Drawing Sheets

(A.S.S.-ACTIVE SECURITY SYSTEM)

WARNING METHOD AND APPARATUS AND PARALLEL CORRELATOR PARTICULARLY USEFUL THEREIN

FIELD AND BACKGROUND OF THE INVENTION

The present invention relates to a warning method and apparatus, for producing a warning upon the occurrence of a predetermined condition at a monitored location. The invention is particularly useful for monitoring a location against unauthorized intrusions, but may also be used for monitoring other conditions, such as fire, smoke, gas, motion, etc. The invention also relates to a parallel correlator particularly useful in such method and apparatus.

Many systems have been devised for monitoring locations to produce a warning in the event of the occurrence of a predetermined condition; such as an unauthorized intrusion. In general, such known systems include a sensor which senses the predetermined condition, and a signalling device which is actuated to produce an audible and/or visual signal when the predetermined condition is sensed. Such systems, however, suffer from a number of drawbacks, as will be described more particularly below.

OBJECTS AND BRIEF SUMMARY OF THE INVENTION

An object of the present invention is to provide apparatus having advantages over the known methods and apparatus in a number of respects as will also be described more particularly below. Another object of the invention is to provide a parallel correlator particularly useful in such method and apparatus.

According to the present invention, there is provided apparatus for monitoring a particular location for the occurrence of a predetermined condition thereat, comprising: a transmitter located at the monitored location for normally transmitting a series of first electrical signals at a predetermined repetition rate and in a predetermined time slot; a receiver for receiving the first electrical signals; a sensor for sensing the predetermined conditions; a signalling device; control means effective, upon sensing the predetermined condition, to interrupt the transmission of the first electrical signals at the predetermined repetition rate to indicate that the predetermined condition has occurred, and to initiate the transmission of a series of second electrical signals at the same repetition rate as the first electrical signals to identify the predetermined condition that has occurred; and a logic circuit for automatically enabling the receiver to receive the first and second electrical signals transmitted by the transmitter just before their expected arrival time, and disabling the receiver from receiving the first and second electrical signals just after their expected termination time.

A preferred embodiment of the invention is described below wherein the predetermined condition sensed is an attempted intrusion to an object or an area. The system, however, can also be used for sensing many other conditions, such as the presence of fire, smoke, gas, an industrial process, or other abnormal conditions, and to provide a warning signal and/or a control signal, when such condition is sensed.

The intervals between electrical signals depend on the specific application. Preferably, the period of each electrical signal is less than the interval between electrical signals by at least three orders of magnitude. For example, each of the electrical signals may be a burst of pulses having a burst period of milliseconds, the pulses being transmitted at a burst rate of seconds.

According to a further feature in the described preferred embodiment, the signalling device is actuated by a cyclically-operable counter which is reset each time an electrical signal is received by the receiver and which actuates the signalling device when the counter reaches it full count without being reset. Preferably, the counter is disabled from receiving the electrical signals except during the phase when the electrical signals are being transmitted, to thereby minimize the possibility of being reset by noise or other false signals, e.g., by jamming.

The invention can be implemented in dedicated systems, wherein the transmitter transmits only the monitoring electrical signals. However, the invention can also be implemented in existing communication systems, both wire and wireless. The invention, for example, is particularly useful in communication systems such as taxi communications systems, wherein the transmitter transmits other information, the monitoring electrical signals being transmitted during idle periods when the other information is not being transmitted. In some case, the transmitter of the security system can "steal a slot" even when the other information is being transmitted, especially in an audio-communication system, or in a data-communication system, when the burst period is short compared to the bit rate of the transmitted data.

The apparatus of the present invention thus provide a number of important advantages over existing monitoring systems. One important advantage is that the apparatus of the present invention provide a "fail safe" monitoring system; that is, a signal (e.g., an audio-alarm and/or visual indicator) will be produced in the receiver whenever the electrical signals from the transmitter is interrupted for any reason, whether because of sensing one of the monitored conditions, or a failure of one of the components (e.g., the power supply, antenna, or other component) at the transmitter.

The invention also makes it virtually impossible for another, e.g., the intruder, to neutralize the monitoring system, by disconnecting the system and/or the antenna, since such an attempt will also actuate the signalling device. Any interruption in the electrical signal transmitted by the transmitter at the monitored location will alert the person monitoring the receiver to investigate whether the interruption was caused by the occurrence of the monitored condition, e.g., an attempted intrusion, or other reason. The system thus enables the antenna to be placed as high as possible to improve the communication range, even though it might be very conspicuous, and does not require protecting either the antenna or the transmitter system against an attempt to neutralize it. It is therefore ideally suited for monitoring open areas containing motor vehicles, motorcycles, tractors, or other objects against attempted intrusions or the occurrence of other predetermined conditions.

Another important advantage is that the apparatus of the present invention permits a substantial reduction in false alarms, and/or savings in power. Thus, since the receiver is enabled by the logic circuit only during the time periods that the pulses transmitted by the transmitter are expected to be received by the receiver, the possibility is minimized of false alarms caused by noise or counter-measures. In addition, significant power is saved in the receiver when it is closed.

The transmitted electrical signals may be periodic bursts of pulses, each pulse burst being for a period less, by at least one order of magnitude and preferably three orders of magnitude, than the interval between pulse bursts. For example, each pulse burst may be milliseconds in duration, and separated by intervals of seconds in duration.

Such an arrangement provides additional advantages. Thus, the transmitter and receiver utilize very little power, thereby enabling each to be operated by small portable batteries having long useful lives. In addition, the system may be incorporated in existing communications systems (e.g., radio communications systems between taxicabs) since the security electrical signals may be transmitted during very short idle periods when the carrier does not carry the other information transmitted by the communications system, or during the actual transmission of the information. If there is any interference, at worst it will be manifested as a very short transient noise. The securing monitoring system of the present invention may thus be incorporated in existing communications systems with a minimum of cost.

The present invention provides still further advantages. Thus, by using coded bursts of pulses having burst periods of the order of milliseconds or nanoseconds and spaced intervals of the order of seconds, for example, there is a very small probability of overlapping between the coded pulses of a number of transmitters. This, in many cases, would obviate the need to synchronize the transmissions even when the system is used to monitor a large number of locations. In addition, a very large number of different codes can be used, one for each condition or location to be monitored, and because of the short transmission time of each pulse burst, such codes would be difficult to break, and/or jam. Each code can also be conveniently changed if desired, e.g., manually or automatically, at periodic intervals.

The security apparatus of the present invention may include a wireless (radio) link between each transmitter and the receiver, or a wire (e.g., telephone, T.V. cable power or communication) link. In many cases, when there is already a wire communication, there is no need for using or adding a wireless option, as distinguished from many existing monitoring systems where a wireless option is still provided even when there is an existing wire communication because of the possibility of cutting the wire communication.

According to another aspect of the invention, upon sensing the predetermined condition, the transmission of the electrical signals at said predetermined repetition rate is interrupted to signal that the predetermined condition has occurred, and the transmission of a second electrical signal is initiated to identify the predetermined condition which has occurred. The second electrical signal may be transmitted at the same repetition rate and in the same time slot as the first-mentioned electrical signal; alternatively, the second electrical signal may be transmitted continuously or in a different time slot from that of the first-mentioned electrical signal.

According to another feature in a preferred embodiment of the invention described below, the first-mentioned electrical signal is in the form of a burst of pulses according to a first coded sequence, and the second-mentioned electrical signal is in the form of a burst of pulses according to a second coded sequence.

According to a further feature in a preferred embodiment of the invention described below, a plurality of different predetermined conditions are sensed, each identified by pulses of different coded sequences, the sensing of any one of the conditions causing the transmission of the first coded pulses to be interrupted and the transmission of the coded pulses for the respective condition to be initiated. Examples of predetermined conditions to be sensed include an attempted intrusion to an object or area, fire, smoke, gas, a particular condition in an industrial process, or almost any other condition to be sensed and to be used for producing a warning and/or a particular control operation.

In a described embodiment, there are a plurality of sensors each for sensing a different predetermined condition, and each controlling the transmitter for transmitting an electrical signal identifying its respective predetermined condition. The transmitter includes an encoder for transmitting the electrical signals in the form of a plurality of pulses to identify the respective condition, and the receiver includes a decoder for decoding the received electrical pulses to identify the respective condition.

According to a further feature in a preferred embodiment of the invention described below, the decoder is a parallel correlator or a matched filter, in hardware or software form, enabling the identification of the transmitted sequence of pulses usually during one sequence duration; however, in case of extreme noise, the decoding may face two or three sequence durations.

It will thus be seen that the apparatus of the present application can be used for producing warnings upon the occurrence of any one of several different conditions, including an attempted intrusion, fire, smoke, etc., while providing all the other advantages described above. Thus, the transmitter normally transmits the master code, but if one of the predetermined conditions (e.g., intrusion, fire, smoke) is sensed, the transmitter discontinues transmitting the master code, and starts to transmit the specific code identifying the sensed condition. The period of transmission of each code may be substantially less than the interval between the transmission of the codes by at least one order of magnitude, and preferably by at least three orders of magnitude, to enable all the advantages described above.

In addition, by using a parallel-correlator or matched filter as the decoder, the code transmitted can be very quickly identified, during the duration of one pulse-sequence. For example, if one bit period is one $\mu s$, and the sequence is built from 32 bits, the decoder usually needs only 32 $\mu s$ to identify the sequence (bit by bit) and to achieve synchronization.

According to a further aspect of the present invention, there is provided a parallel correlator for determining whether a sequence of pulses matches a reference sequence, comprising: a shift register for receiving the sequence of pulses in a serial manner; a plurality of reference storing devices for storing the reference sequence; comparator means for comparing the value in each register of the shift register with that in each reference register to determine whether a match exists; a parallel-to-serial converter for receiving the outputs of the comparator means in parallel and for converting them to serial outputs; a counter for counting the latter serial outputs; and a threshold circuit for providing an output signal when the count outputted by the counter is above a predetermined threshold value.

Such a parallel correlator is particularly useful, but not exclusively useful, in the above-described monitoring apparatus.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
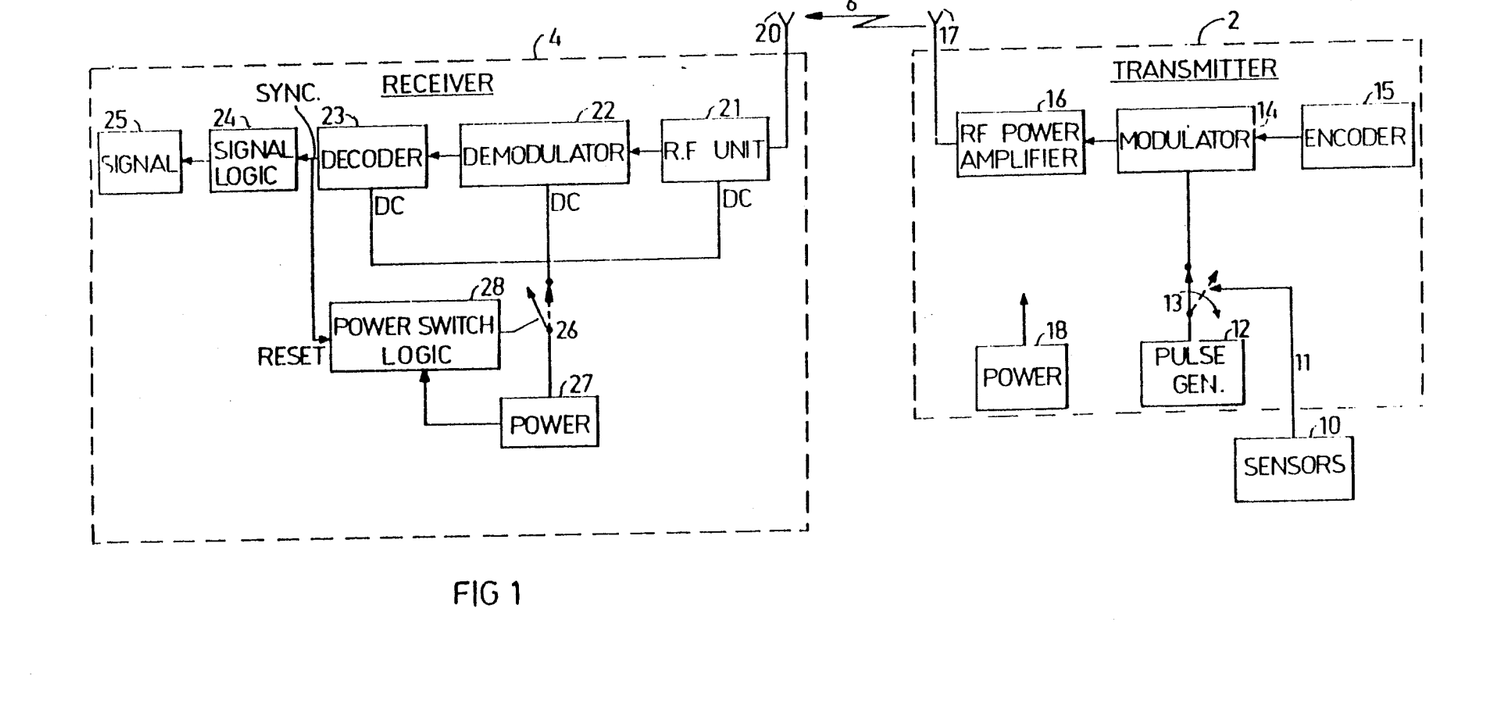
FIG. 1 illustrates one form of apparatus constructed in accordance with the present invention.
Figure 2:
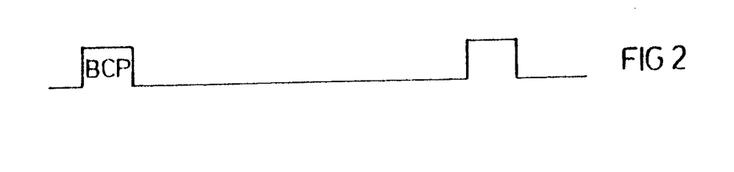
FIG. 2 is a diagram helpful in explaining the operation of the of FIG. 1.
Figures 3, 4:
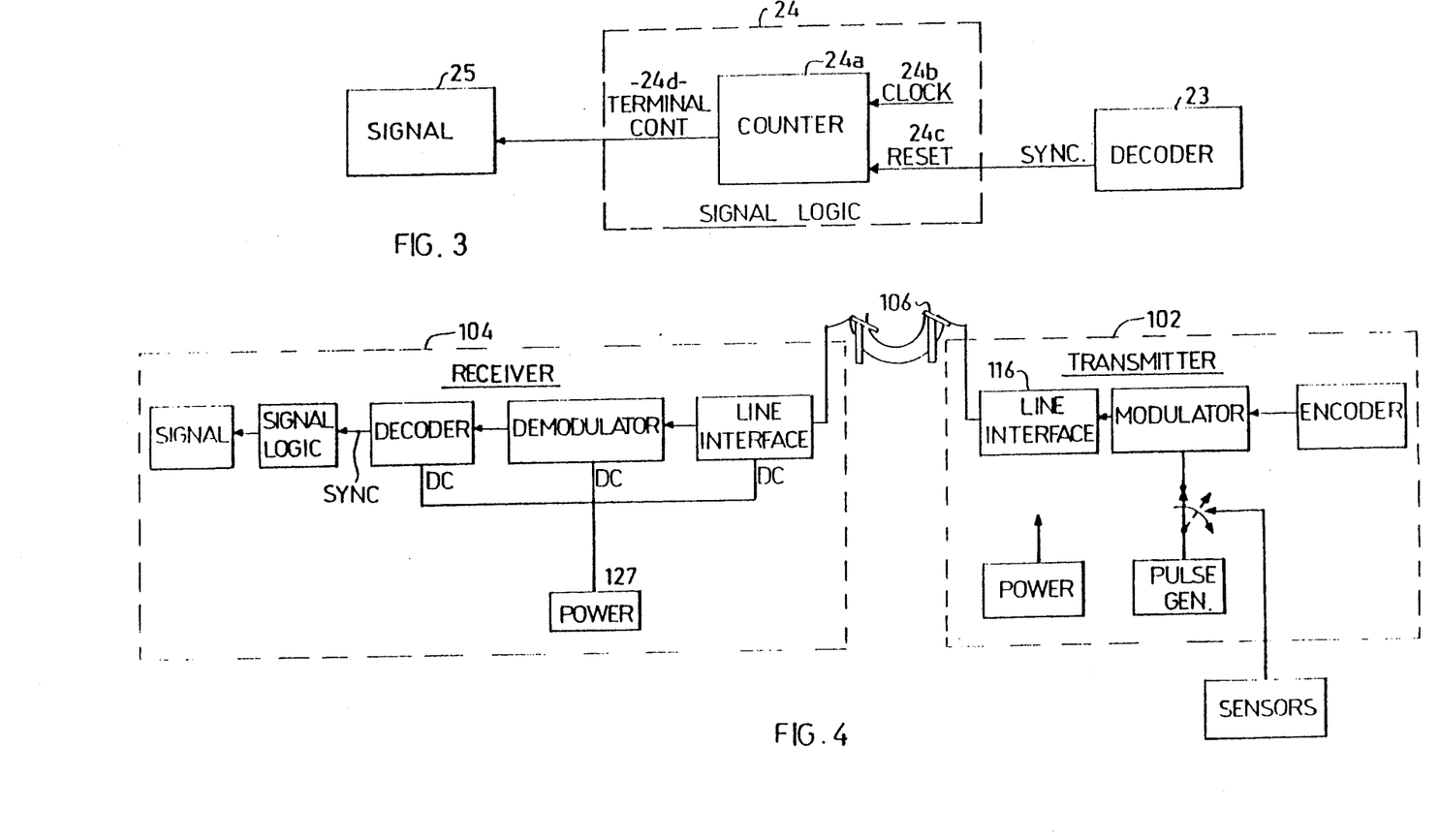
FIG. 3 illustrates the alarm logic circuitry in the system of FIG. 1.
FIGS. 4–6 illustrate further systems constructed in accordance with the present invention.

The Embodiment of FIGS. 1-3

FIG. 1 illustrates one form of apparatus constructed in accordance with the present invention, including a transmitter, generally designated 2, communicating with a receiver, generally designated 4, via a wireless or radio transmission link 6. The transmitter 2 is located at the site to be monitored, and the receiver 4 is located at a remote site. For example, the transmitter 2 may be located on a motor vehicle to be monitored against intrusion, and the receiver 4 may be carried by the owner so as to enable the owner to continuously monitor the vehicle.

The transmitter 2 at the monitored location includes a sensor 10 for sensing the condition to be monitored. If a motor vehicle is being monitored, sensor 10 may be, e.g., an electrical switch or a plurality of electrical switches for sensing unauthorized attempts to open the vehicle door, hood, trunk, window, etc., or to bypass the ignition switch. If an area is being secured, sensor 10 may also be an electrical switch, an ultrasonic type sensor, a radiowave sensor, or any other known sensor. When the condition being monitored is sensed, sensor 10 outputs an electrical signal via its output line 11.

The transmitter unit 2 further includes a pulse generator 12 which generates a series of coded pulses applied via an electrical switch 13 to a modulator 14 controlled by an encoder 15, preferably programmable, so as to enable changing the code if desired. In the normal position of switch 13, the pulses generated by generator 12 enable the modulator to transmit an electrical signal, in the form of a burst of pulses encoded by encoder 15, at a predetermined repetition rate. The period of each burst of pulses is less than the interval between the bursts by at least one order of magnitude, preferably by three orders of magnitude.

This is more clearly illustrated in FIG. 2, illustrating the output of pulse generator 12, wherein it will be seen that the output includes a burst of coded pulses BCP having a period in the order of milliseconds, whereas the burst rate is in the order of seconds, so that the period of each burst of code pulses BCP would be less than the interval between the bursts by three orders of magnitude.

The output of modulator 14 is fed to an RF power amplifier 16, for wireless transmission via antenna 17 to the remotely-located receiver 4. The power supply for the transmitter unit 2 is indicated by box 18.

Switch 13 between the pulse generator 12 and modulator 14 has two positions. Normally, it is shown in the full-line position illustrated in FIG. 1, so that the pulses are continuously supplied to modulator 14 and transmitted by antenna 16 to the remotely located receiver unit 4. However, whenever sensor 10 senses the monitored condition (e.g., an unauthorized intrusion attempt), it outputs a signal via line 11 to switch 13, actuating the switch to its broken-line position, thereby interrupting the supply of pulses to the modulator 14, and the transmission of the pulses to the receiver unit 4.

The remotely-located receiver unit 4 includes a receiving antenna 20 feeding the received electrical signals to an RF unit 21. These signals are demodulated in demodulator 22 and decoded in decoder 23. The decoded signals are applied to a signal logic circuit 24 controlling a signalling device 25. As will be described more particularly below with respect to FIG. 3, the signal logic circuit 24 actuates the signalling device 25 whenever the transmission of the pulses from the transmitter unit 2 is interrupted. Signalling device 25 may include an audible signal (e.g., buzzer), or a visual signal (e.g., lamp), or a telephone dialling device, actuated by the signal logic unit 24 whenever there is an interruption in the reception of the pulses from the transmitter unit 2.

The receiver unit 4 further includes an electrical switch 26 connecting the power supply 27 to the above-described unit, which electrical switch may be manually turned off whenever desired to save power or to reduce the possibility that noise or other false signals not transmitted from the transmitter unit 2 will prevent the operation of the signalling device, as will be described more particularly below. Alternatively, switch 26 may be normally off, but automatically turned on by the decoder unit 23, via a power switch logic unit 28, just before the expected time of arrival of the burst of coded pulses BCP from the transmitter unit 2. The decoder 23 outputs a sync pulse to the signal logic circuit 24, and also to the power switch logic 28 to reset the timing for the next closing of switch 26.

FIG. 3 more particularly illustrates the signal logic unit 24. Thus, it includes a counter 24a which is cyclically operated by clock pulses applied to its clock input 24b. Counter 24a includes a reset input 24c which receives the sync pulses from decoder 23, such that each time counter 24a receives one such pulse, the counter is reset to "zero". Counter 24a includes an output 24d connected to the signalling device 25 such that when the counter reaches its full count without being reset, it actuates the signalling device 25.

As indicated above, switch 26 which connects the electrical circuit to the power supply 27 may be manually turned off to save power, or may be automatically turned off for the complete cycle except during the phase or portion of each cycle containing the pulses transmitted by transmitter unit 2, to avoid noise or other false signals from suppressing the actuation of the alarm 25 during an actual alarm condition. Thus, during an actual alarm condition, when transmitter unit 2 ceases to transmit pulses, the receiver unit 4 may nevertheless receive pulses derived from noise or false pulses intended to disable the alarm system, which false pulses would reset counter 24a and thus suppress the actuation of the signal device 25. This possibility is substantially reduced by disconnecting the electrical receiver circuit from receiving pulses that could reset the counter 24a except during the relatively small time slot or phase of each cycle during which the transmitter unit 2 transmits its pulses which reset the counter; in addition, this described arrangement saves power, thereby enabling small batteries to be used at the site.

When the receiver unit 4 is initially turned on, the power switch logic circuit 28 would close switch 26 until synchronization is attained on the sync pulses from the decoder unit 23, after which the power switch logic 28 would maintain switch 26 open except during the time slot that the transmitter unit 2 transmits the resetting pulses.

The operation of the system illustrated in FIGS. 1–3 will be apparent from the above description. Thus, the transmitter unit 2 at the monitored location (e.g., on or adjacent to an object or area to be secured against unauthorized intrusion) continuously transmits an electrical signal in the form of the burst of codes pulses BCP illustrated in FIG. 2 at a predetermined repetition rate. In the described example, the burst period is in the order of milliseconds, and the burst rate is in the order of seconds, so that each few seconds there will be transmitted via antenna 16 a burst of codes pulses each burst having a duration of milliseconds and coded via encoder 15 for the particular monitored location or condition. This is what occurs when sensor 10 does not sense the particular condition being monitored, e.g., an attempt to make an unauthorized intrusion with respect to the object or area being secured.

If the monitored condition is sensed, sensor 10 actuates electrical switch 13 to its broken-line position illustrated in FIG. 1, to interrupt the supply of pulses by pulse generator 12 to modulator 14, and thereby to interrupt the transmission of the pulses by the transmitter unit 2.

The remotely-located receiver unit 4 receives the pulses transmitted by the transmitter unit 2. So long as the transmission of the pulses is not interrupted, i.e., the monitored condition (intrusion) is not sensed by sensors 10, the pulses are fed via the RF unit 21, demodulator 22, and decoder 23, to the signal logic circuit 24. As described above with reference to FIG. 3, the counter 24a of the signal logic circuit 24 is continuously incremented by clock pulses applied via its input 24b, but is reset by the sync pulse from decoder 23 each time the receiver unit 4 receives a burst of pulses. Accordingly, so long as the pulse bursts are being received, counter 24a never reaches its full count. However, if there is an interruption in the receipt of these pulses, counter 24a will reach its full count, whereupon it outputs a signal via its output terminal 24d to the signalling device 25, thereby actuating that device.

Power switch 26 of the receiver unit 4 may be manually turned off, whenever desired, to save power. As described above, power switch 26 is also controlled by the power switch logic circuit 28, synchronized by the decoder circuit 23, to turn-off the power of the receiver unit 4 except during the time slot or phase when the transmitter unit 2 transmits its resetting pulses, to thereby minimize the possibility that noise signals, or countermeasure signals, will reset the counter 24a, and thereby suppress the actuation of the alarm unit 25, even when a monitored condition is sensed and the transmitter unit 2 ceases to transmit its resetting pulses.

The Embodiment of FIG. 4

FIG. 4 illustrates apparatus similar to that of FIGS. 1–3, except that instead of including a wireless (radio) link between the transmitter unit 102 located at the site of the object or area being monitored, and the remotely-located receiver unit 104, a wire link, schematically indicated at 106, is used. In this case, wire link 106 is the telephone line, power line, T.V. cable line or other line. Accordingly, the transmitter unit 102 includes a line interface 116 (instead of an RF power amplifier 16 and a transmitting antenna 16), and the receiver unit 104 includes a line interface 120 (instead of the receiving antenna 20 and the RF unit 21).

While the receiver unit 104 in the system of FIG. 4 does not include a power switch, comparable to switch 26 in FIG. 1, it will be appreciated that such a switch could be provided in a similar arrangement as described with respect to FIG. 1 in order to reduce fail-alarm conditions and/or to save power. In addition, while the transmitter unit 102 and the receiver unit 104 in FIG. 4 illustrates the inclusion of a power supply 127, it will be appreciated that such units may use the power from the line.

In all other respects, the system illustrated in FIG. 4 is constructed, and operates in the same manner, as the system described above with respect to FIGS. 1–3.

The systems illustrated in FIGS. 1–4 may be dedicated systems, i.e., used only for monitoring purposes. A particular advantage of the present invention, however, is that the monitoring system may also be incorporated in existing communications systems, such as radio communications systems between taxis, or line communication systems between computers, banks, T.V. cables, etc., thereby minimizing the expense of incorporating a security system in an existing communications system. This advantage is present because of the extremely small period of the radio transmission which is needed for transmitting the burst of coded pulses BCP (FIG. 2). Thus, as described above, these pulses may be transmitted during idle periods when the communication system is not transmitting the normal information, or sometimes even during normal transmission periods; if there is any interference, it will be in the form of a very short transient noise which will not be unduly disturbing.

Figure 5:
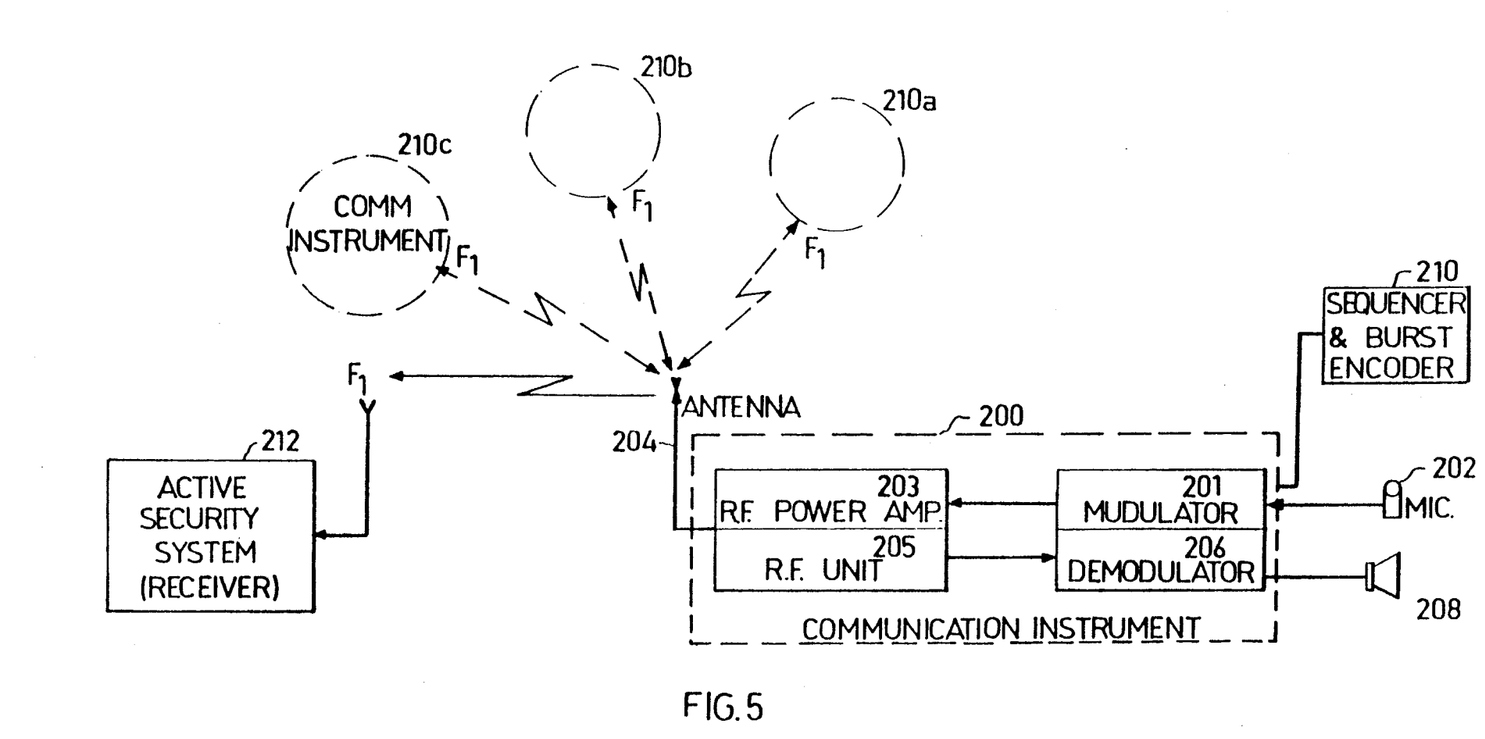

The Embodiment of FIG. 5

FIG. 5 illustrates the invention incorporated in an existing communications system, such as a taxi communications system. Thus, the communications system, generally designated 200, includes a modulator 201 receiving signals corresponding to the audio messages to be transmitted and inputted by microphone 202, which signals are modulated onto a carrier wave in RF power amplifier 203 and transmitted via antenna 204. The central station, and all the taxicabs in communication with the central station are normally equipped with such a communication system 200 to permit two-way communication between the taxicabs and the central station.

In accordance with the present invention, the communication system 200 of each of the taxicabs would be provided with an encoder, therein designated 210, to produce a burst of coded pulses BCP identifying the respective taxicab and occupying only a very small interval (e.g., of the idle period) in the normal use of the communication system. The central location would also include an active monitoring system, generally designated 212 in FIG. 5, which would include the decoder 23 in FIG. 1, the signal logic 24 and the signal device 25, such that upon the interruption of the reception of the burst of coded pulses from any particular taxicab, the signal device 25 would be actuated to indicate the occurrence of the monitored condition (e.g., an attempted intrusion), the particular taxicab involved being identified by its code.

Receiver 212 could be located at the central station monitoring a fleet of taxicabs. A receiver 212 could also be provided for each individual cab driver, e.g., as a beeper, to enable him to monitor the status of his own taxicab.

Figure 6:
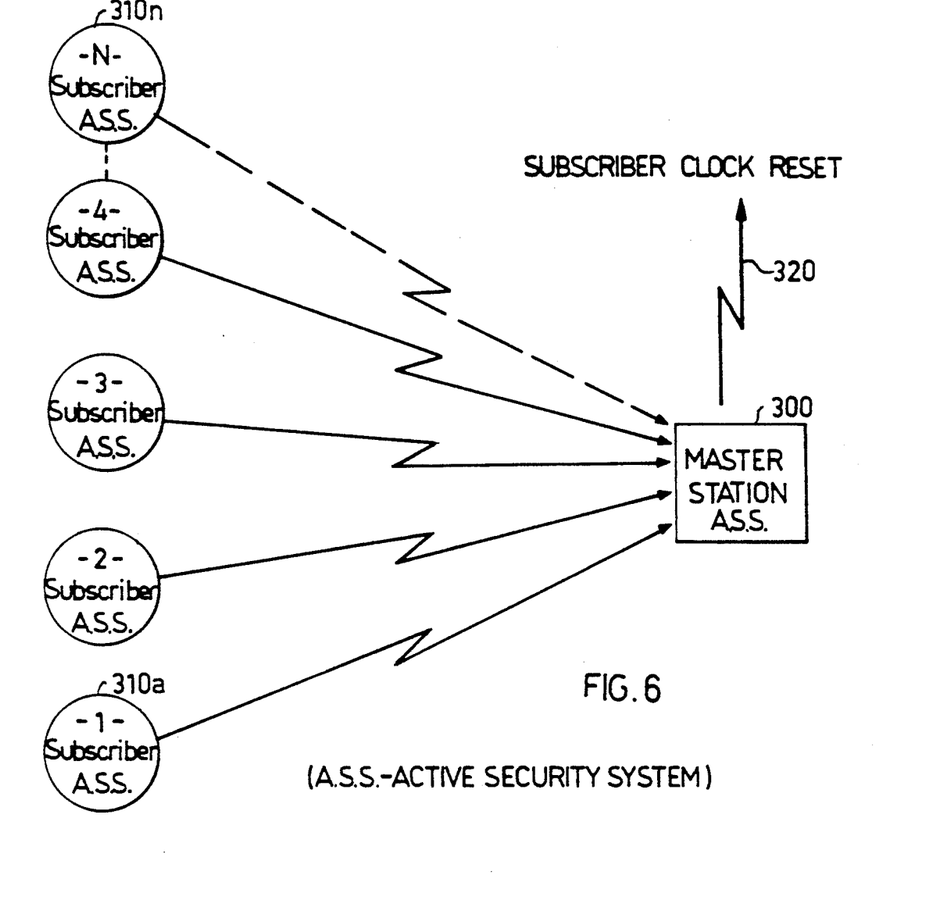

The Embodiment of FIG. 6

FIG. 6 illustrates the invention incorporated in another type of system, wherein the transmitters at the various monitored locations transmit via the same channel their bursts of coded pulses BCP during different time slots, and the remotely-located receiver scans the time slots of the transmitters at the various locations to sense whether they are properly transmitting. Such systems may be synchronized or asynchronized networks.

Thus, the system illustrated in FIG. 6 includes a master station 300, monitoring a plurality of subscriber or user units 310a–310n. Each such unit includes a transmitter unit corresponding to transmitter unit 2 in FIG. 1 capable of transmitting a burst of coded pulses BCP and a special code to identify the respective subscriber or user unit 2 in an async network, or only the BSP code in a sync network. (Thus, in a sync network it is not necessary to transmit the user's name because the time slot may be the identification name [sign] of the respective subscriber.) However, these coded pulses are transmitted during a different time slot in each cycle, which time slots are scanned by the receiver in the master station 300. If one of the subscriber or user units 310a–310n experiences an interruption in the transmission of its burst of coded pulses, because of the occurrence of a monitored condition (e.g., an attempted intrusion), this will be sensed by the master station 300 in the same manner as described above.

A stranger station may transmit signals to reset the timing devices against drift, as indicated at 320.

The system illustrated in FIG. 6 is to be distinguished from conventional multiplexing and TDMA systems in the following respects.

Thus, multiplexing is a method of signalling characterized by the simultaneous and/or sequential transmission and reception of multiple signals over a common channel with means for positively identifying each signal. The signalling may be accomplished over a wire path, a radio carrier, or a combination of both. In a multiplexing system, the subscriber is passive; therefore, any failure in the transmission to the subscriber will cause a false alarm. In addition, a multiplexing system requires the additional time for transmitting to each subscriber.

In TDMA (time division multiplexing) every subscriber has its own time slot but need not use the time slot all the time. In the technique illustrated in FIG. 6, however, each subscriber must use its own time slot to achieve the fail-safe monitoring.

The decoder included in all the above described embodiments is preferably a parallel correlator, or matched filter of known type, which checks all the code positions at one time, and therefore enables the coded pulses to be included usually in a single sequence, but sometimes, in case of noise, in two or three sequences. Using such a decoder enables very fast identification of the transmission, since it can identify the transmitted sequence (code, BCP) during the duration of one sequence, and it saves time (and/or hardware) needed to achieve bit-sync, frame-sync, and data recovery. For example, if one bit period is 1 $\mu$s, and the sequence is built from 32 bits, the decoder usually needs only 32 $\mu$s to identify the sequence (bit by bit), and to achieve synchronization. The transmitter may therefore transmit usually only one sequence (code, BCP) at each burst. Other advantages in using such a decoder is that it provides relative immunity with respect to stronger transmitters (jammers) and achieves better separation with respect to many different users or many different sensor. Using such a decoder (with correlator) enables, for example, the use of the system of FIG. 6 even where there are thousands of subscribers.

Figure 7:
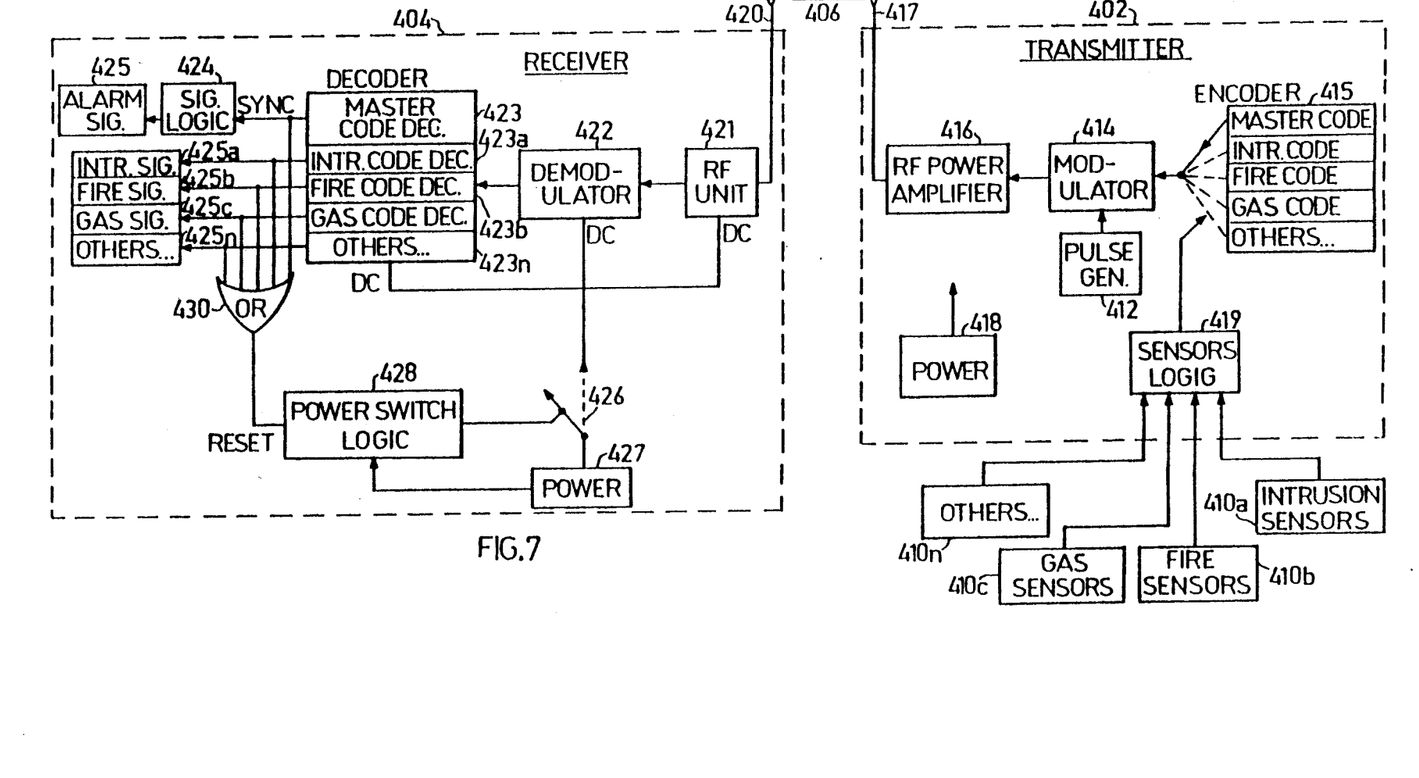
FIG. 7 is a block diagram illustrating another form of apparatus constructed in accordance with the invention.
Figure 8:
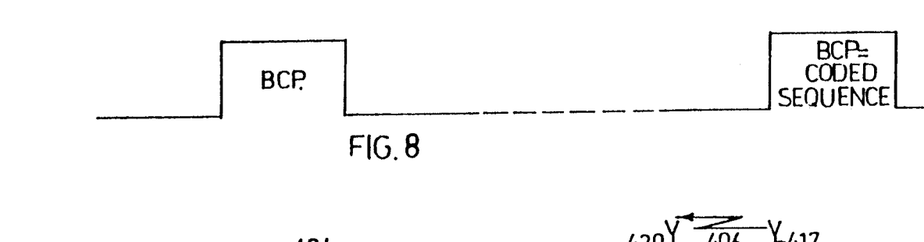
FIG. 8 is a timing diagram illustrating the operation of the apparatus of FIG. 7.

The Embodiment of FIGS. 7 and 8

The apparatus illustrated in FIG. 7 is basically the same as illustrated in FIG. 1, except that the apparatus in FIG. 7 is modified to enable it to be used for sensing a number of predetermined conditions, including intrusion, fire, gas, etc. Thus, the apparatus illustrated in FIG. 7 also includes a transmitter, generally designated 402, and a receiver, generally designated 404, coupled to the transmitter via a wireless RF link 406 (or a wire link).

Transmitter 402 includes, instead of one sensor, a plurality of sensors 410a–410n to sense the various conditions. As in the apparatus described earlier, transmitter 402 further includes a pulse generator 412 controlling a modulator 414 in accordance with the signals from an encoder 415, to transmit the signals via an RF power amplifier 416 supplied with power from a power supply 418. In this case, however, encoder 415 is capable of applying to the transmitted signal any one of several different codes according to the condition sensed by the respective sensor 410a–410n, the latter sensors being connected to encoder 415 via a sensors logic circuit 419.

Thus, under normal operating conditions, encoder 415 encodes the transmitted signal from modulator 414 according to a burst of pulses having a first predetermined sequence; this burst of pulses is hereinafter called the master pulses or master code. If one of the predetermined conditions is sensed by one of the sensors 410a–410n, the transmission of the master pulses is terminated, and instead a burst of pulses having a different coded sequence (hereinafter called the sensor pulses or sensor sequence) is transmitted according to the condition sensed. Thus, if an intrusion is sensed, sensor 410a controls encoder 415 via sensor logic 419 to interrupt the transmission of the master code, and to initiate the transmission of the sensor code indicating that an intrusion was sensed. On the other hand, if the fire sensor 410b is actuated, the transmission of the master code is interrupted and instead the sensor code for fire is transmitted.

FIG. 8 is a diagram illustrating the burst period of the transmitted pulses compared to the burst rate between the transmission of pulses. The burst period is substantially less by at least one order of magnitude, and preferably by at least three orders of magnitude, than the burst rate. For example, the burst period may in milliseconds, microseconds or even nanoseconds, whereas the burst rate should preferably be in seconds.

Preferably, the transmitted pulses of the sensor code are at the same repetition rate, and in the same time slot, as the transmission of the pulses in the master code, as illustrated in FIG. 8. This would provide all the advantages described above. It is contemplated, however, that the sensor code could be transmitted either continuously, or in a different time slot from that of the master code.

The receiver 404 is similarly constructed as the receiver described above. It includes a receiver antenna 420 feeding the received electrical signals to an RF unit 421, which signals are demodulated in demodulator 422 and decoded. However, in this case there are a plurality of decoders: namely, decoder 423 for the master code, and decoders 423a–n for each of the sensors. The latter decoders are capable of identifying any one of the codes transmitted by transmitter 402, and to actuate, via the signal logic circuit 424, the appropriate signal 425 or signal 425a–425n.

Thus, so nothing abnormal occurs in all the monitored locations, the transmitter unit 402 transmits the master code pulses which are decoded by the master code decoder 423 and which continuously resets the signal logic circuit 424 so as to suppress the master alarm 425. However, should any one of the monitored conditions be sensed by one of the sensors 410a–410n, the transmission of the master code will be interrupted, and this fact will be sensed by master code sensor 423 which will fail to reset the signal logic circuit 424, so that the latter circuit will actuate the master alarm signal 425, thereby signalling that one of the monitored conditions has occurred.

With the interruption of the transmission of the master code, there will now be transmitted one of the sensor codes, responding to the sensor 410a–410n which had been actuated. The sensor code transmitted will now be sensed by one of the sensor decoders 423a–423n, and that decoder will directly actuate its respective signal 425a–425n, to thereby identify the particular condition sensed.

As in the circuit described with respect to FIGS. 1-3 above, the receiver 404 further includes an electrical switch 426 connecting the receiver to the power supply 427, which electrical switch may be manually turned off whenever desired to save power. In addition, as also described with respect to FIGS. 1-3, switch 426 may normally be off, but automatically turned on by a power switch logic circuit 428 during the expected time of arrival of the burst of coded pulses BCP from the transmitter unit 402. In this case, however, the power switch logic 428 is controlled not only by the master code decoder 423, but also by the sensor code decoders 423a–423n, so that whichever of the above codes is transmitted, this logic circuit is synchronized on the time of arrival of the transmitted slots to control switch 426 to enable the receiver circuit only during the time slot when one of the above codes is being transmitted. As described above, this feature not only saves power, but also reduces the possibility of "fail-alarm" conditions caused by noise or false signals received by the receiver, e.g., from one attempting to jam the receiver and to prevent its proper operation.

It will thus be seen that the apparatus illustrated in FIG. 7 operates substantially the same as described earlier, except that the system illustrated in FIG. 7 is capable of sensing and identifying many different conditions, including intrusion, fire, gas, etc., while retaining all the advantages in the system described in.

While FIG. 7 illustrates a system including a wireless coupling between the transmitter and receiver as in FIG. 1 above, it will be appreciated that the same system can use a wire coupling, such as telephone lines T.V. cable lines or other wire line.

Figure 9:
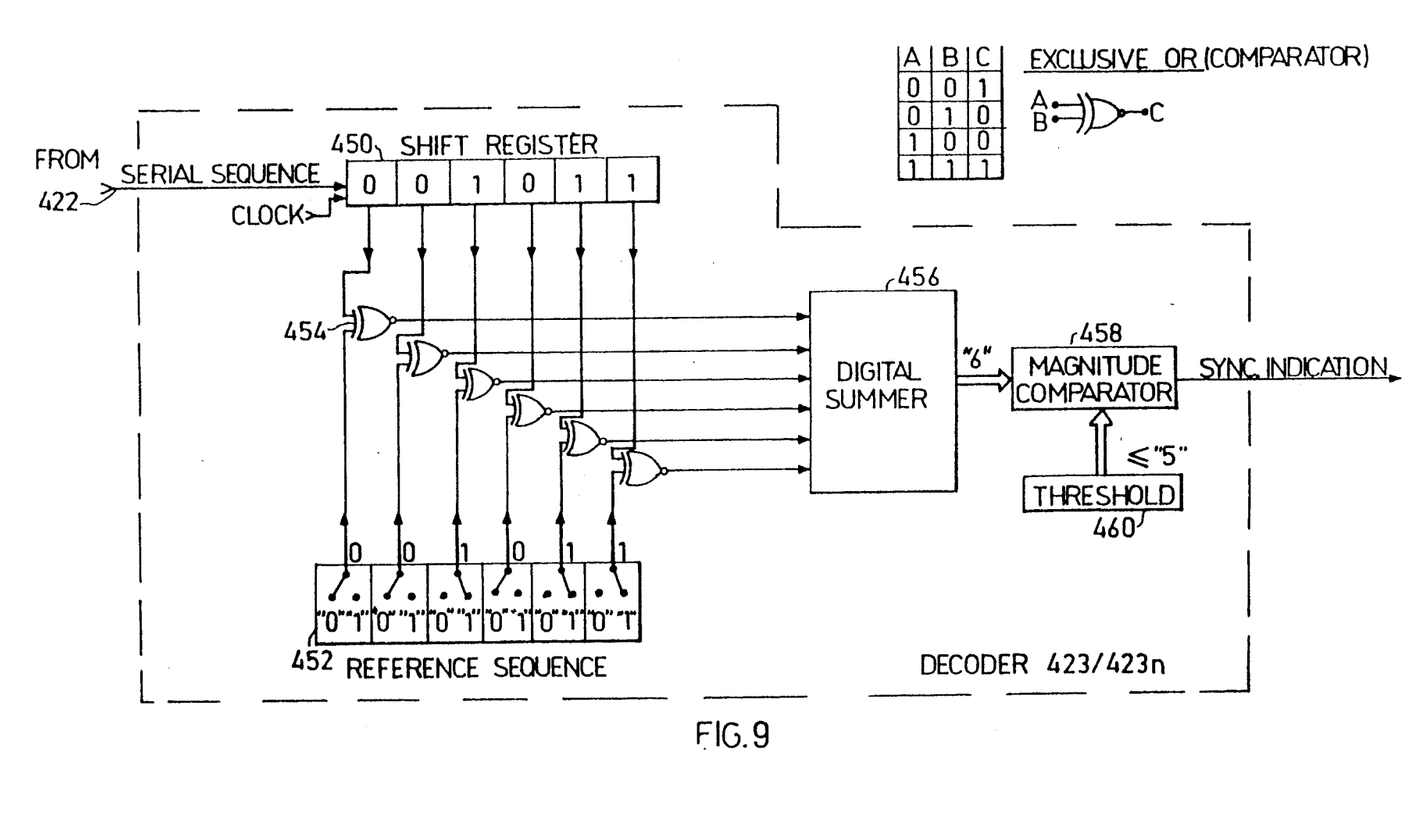
FIG. 9 illustrates one form of parallel-correlator which may be used for the decoder in the apparatus of FIG. 7, as well as in FIGS. 1-6.
Figure 10:
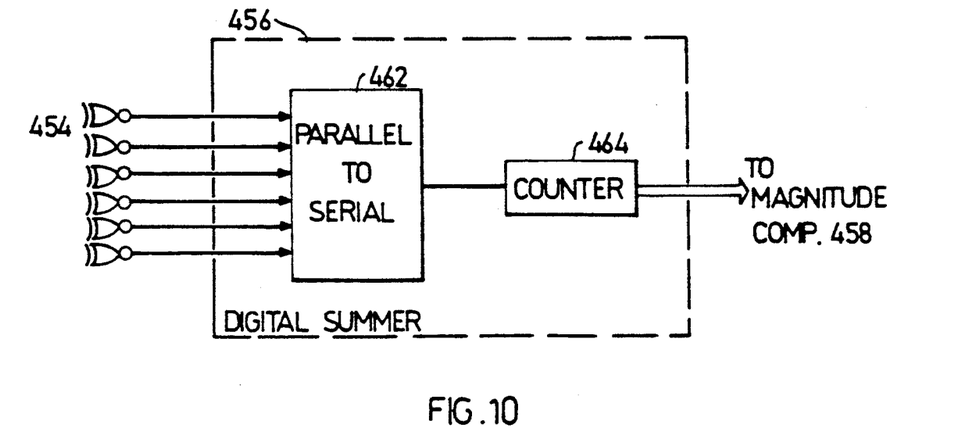
FIG. 10 is a block diagram illustrating the construction of the digital summer in the parallel correlator of FIG. 9.

An Example of a Parallel-Correlator Decoder (FIGS. 9 and 10)

FIG. 9 illustrates one form of parallel-correlator decoder which may be used for the master decoder 423 as well as the sensor decoders 423a–423n. To simplify the description, FIG. 9 illustrates a correlator having a length only of six bits, it being appreciated that the actual length of the correlator would be or may be in the order of tens or even hundreds of bits.

Thus, the correlator illustrated in FIG. 9 comprises a shift register 450 for receiving the sequence of pulses from the demodulator 422 in a serial manner. The correlator further includes a plurality of reference, storage devices, e.g., registers or switches, 452 for storing a reference sequence, which reference sequence may be manually or automatically preset or changed as desired. Comparator means, in the form of a plurality of Exclusive-Or gates 454, compares the value in each register of the shift register 450 with that in each of the registers 452 to determine whether a match exists. Thus, if a match does exist, a "1" will be outputted from the respective gate 454. The outputs from gates 454 are fed in parallel to a digital summer 456 which outputs a value representing the number of matches between the shift registers 450 and the reference registers 452. For example, if in this case a match exists between all the shift registers and reference registers, indicating that the serial sequence from demodulator 422 corresponds to the reference sequence preset in the reference registers 452 for all six bits of the two registers, the digital summer will output the value "6". This value is fed to a threshold circuit including a magnitude comparator 458 which may be preset by a threshold presetting device 460, so that when the value outputted by digital summer 456 is above the predetermined threshold value, a sync pulse will be outputted from the magnitude comparator 458. As indicated above, the parallel correlator for the master code decoder 423 will thus reset the signal logic circuit 424 to suppress the actuation of the alarm signal 425 so long as the master code is being transmitted, but immediately upon its interruption, it will fail to reset the signal logic circuit 424, and therefore that circuit will actuate the alarm signal 425 to indicate that a monitored condition has been detected.

This sync pulse produced by the master code decoder 423, as well as the sync pulse produced by the sensor code decoders 423a–423n when a monitored condition is sensed by one of them, is also used for synchronizing the operation of switch 426, via gate 430 and power switch logic circuit 428, as described above in order to minimize the possibility of disabling the alarm signal by false pulses, e.g., noise or jamming.

As indicated above, in practise each of the correlators used for the decoders 423 and 423a-423n would include tens or possibly even hundreds of bits. Since the digital summer 456 receives this information in parallel fashion, this so complicates the construction of the digital summer (to perform parallel summing) such that it is almost impossible to do this with discrete digital components or even with PAL (programmable array logic) where the correlator has a length of many tens or hundreds of bits.

FIG. 10 illustrates a construction which may be used for the digital summer 456 in FIG. 9 to enable the digital summer to be considerably simplified.

Thus, the digital summer 456 illustrated in FIG. 10 comprises a parallel-to-serial converter 462 which receives the information outputted in parallel from the OR-gates 454, and converts this information to serial form. For example, converter 462 may be a multiplexer or a shift register that converts the parallel data into serial form. This data is outputted to a counter 464 which counts the number of matches ("1"s) outputted by the OR-gates 454, so that if six matches occurred, the value "6" would be outputted by counter 464. The value of counter 464 is outputted to the magnitude comparator 458 in FIG. 9.

The digital summer illustrated in FIG. 10 is considerably simplified and may be built of discrete components or PAL (programmable array logic) technology.

While the invention has been described in connection with several preferred embodiments, it will be appreciated that their may be many variations. For example, some of the described functions can be implement by software or hardware. Many other variations, modifications and applications of the invention may be made.

What is claimed is:

1. Apparatus for monitoring a particular location for the occurrence of a predetermined condition thereat, comprising:
   a transmitter located at the monitored location for normally transmitting a series of first electrical signals at a predetermined repetition rate and in a predetermined time slot;
   a receiver for receiving said first electrical signals;
   a sensor for sensing the predetermined condition;
   a signalling device;
   control means effective, upon sensing the predetermined condition, to interrupt the transmission of said first electrical signals at said predetermined repetition rate to indicate that the predetermined condition has occurred, and to initiate the transmission of a series of second electrical signals at the same repetition rate as said first electrical signals to identify the predetermined condition that has occurred;
   and a logic circuit for automatically enabling said receiver to receive said first and second electrical signals transmitted by said transmitter just before their expected arrival time, and disabling said receiver from receiving said first and second electrical signals just after their expected termination time.

2. The apparatus according to claim 1, wherein said transmitter transmits said electrical signal in the form of a burst of pulses having a burst rate which is at least one order of magnitude larger than its burst period.

3. The apparatus according to claim 1, wherein said control means for actuating said signalling device includes a power switch which is automatically actuated by said logic circuit to enable the receiver by turning-on the power to the receiver, and to disable the receiver by turning-off the power to the receiver.

4. The apparatus according to claim 1, wherein said control means is effective to initiate the transmission of said second electrical signals in the same time slot as said first electrical signals.

5. The apparatus according to claim 1, wherein said transmitter transmits only said first and second electrical signals.

6. The apparatus according to claim 1, wherein said transmitter transmits other information, said first and second electrical signals being transmitted during idle periods when said other information is not being transmitted.

7. The apparatus according to claim 1, wherein said transmitter transmits other information, said first and second electrical signals being transmitted during the time said other information is being transmitted.

8. The apparatus according to claim 1, wherein there are a plurality of monitored objects or areas, each including a transmitter transmitting a series of electrical signals, said receiver including means for identifying the monitored object or area of the received electrical signals by the time slot and/or by specific code.

9. The apparatus according to claim 8, wherein said transmitter includes an encoder for transmitting the electrical signals in the form of a plurality of pulses to identify the respective object or area, and said receiver includes a decoder for each sensor for decoding the received electrical pulses to identify the respective sensor which actuated the transmitter according to the predetermined conditions sensed.

10. The apparatus according to claim 9, wherein each of said decoders is a parallel correlator or matched filter enabling the identification of the transmitted sequence of pulses.

11. The apparatus according to claim 10, wherein said control means includes a cyclically-operable counter which is reset each time a pulse is received by the receiver, and which actuates the signalling device when the counter reaches its full count without being reset;
   and wherein each of said parallel correlators includes:
   a shift register for receiving said sequence of pulses in a serial manner;
   a plurality of reference registers for storing a reference sequence;
   comparator means for comparing the value in each register of the shift register with that in each reference register to determined whether a match exists;
   a digital summer for outputting a value representing the number of matches between the values in said shift register and reference registers;
   and a threshold circuit for providing an output pulse to said counter to reset it when the value outputted by said digital summer is above a predetermined threshold value.

12. The apparatus according to claim 11, wherein said logic circuit includes switching means which normally disables the receiver but enables it during the time slot when said first and second signals are to be transmitted by said transmitter units; said switching means including a synchronizing circuit which is reset by said output pulse from said threshold circuit.

13. The apparatus according to claim 11, wherein said digital summer comprises:
a parallel-to-serial converter for receiving the outputs of said comparator means in parallel and for converting them to serial outputs;
and a counter for counting said latter serial outputs and outputting the count to said threshold circuit.

14. The apparatus according to claim 8, wherein said receiver includes polling means individually triggering said transmitters to identify the respective sensor actuating the transmitter.

15. The apparatus according to claim 14, wherein said polling means is cyclically operated.

16. The apparatus according to claim 1, wherein each transmitter transmits its respective electrical signal to the receiver via a wireless link.

17. The apparatus according to claim 1, wherein each transmitter transmits is respective electrical signal to the receiver via a wire link.

18. The apparatus according to claim 1, wherein said control means includes means for controlling the transmitter to transmit said first-mentioned signals in the form of bursts of pulses according to a first coded sequence at said predetermined repetition rate, and to interrupt the transmission of said pulses at the first coded sequence upon the sensing of said predetermined condition and to initiate the transmission of said second signals in the form of pulses according to a second coded sequence at said predetermined repetition rate.

19. The apparatus according to claim 18, wherein there are a plurality of sensors for sensing different predetermined conditions, said control means including means for controlling said transmitter to output said second signal pulses according to an individually coded sequence for the respective sensor.

20. The apparatus according to claim 19, wherein there is at least one sensor for sensing an attempted intrusion to a secured area or object, and at least one other sensor for sensing the presence of fire, smoke, gas or other abnormal condition.

* * * * *